E. CHRISTOPHER.
FERTILIZER DISTRIBUTER.
APPLICATION FILED APR. 17, 1911.
1,022,062.
Patented Apr. 2, 1912.
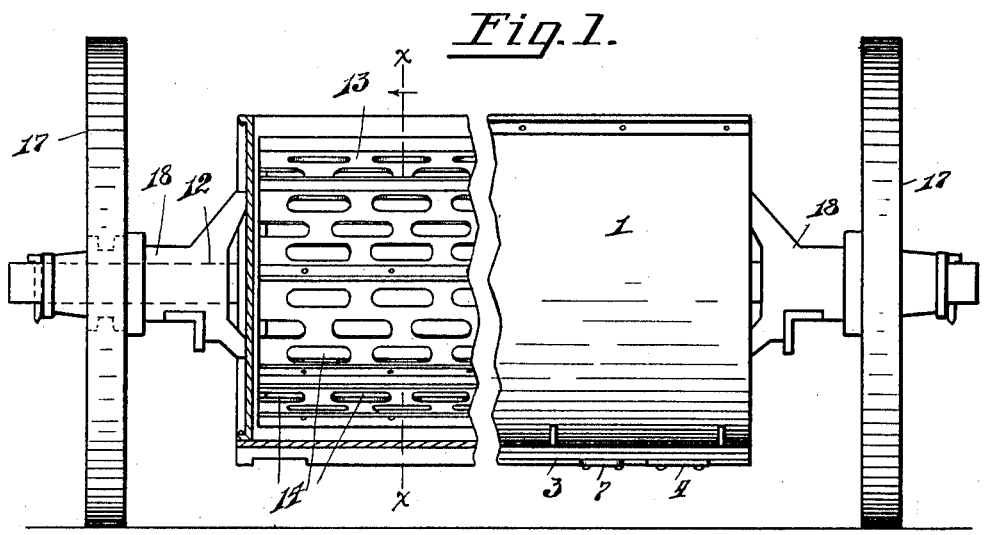
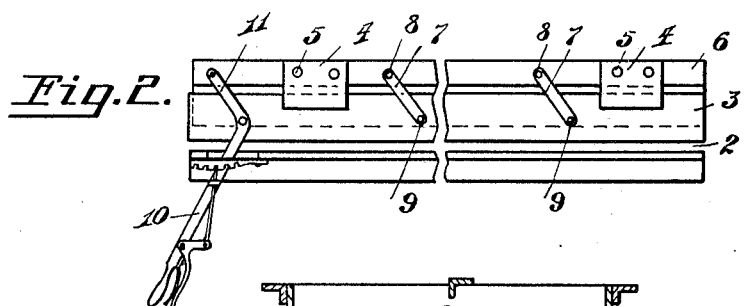
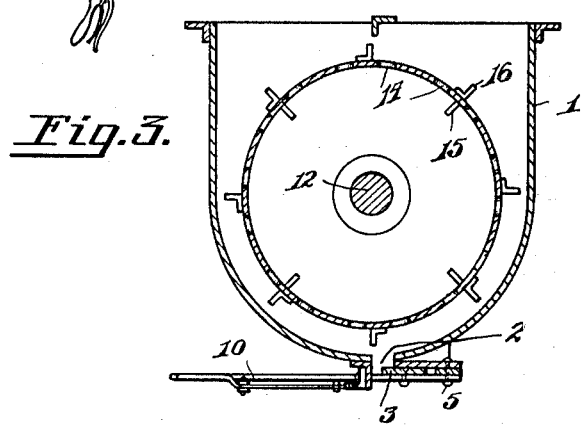
WITNESSES:
G. M. Cole.
Frances Rusk.
EUGENE CHRISTOPHER.
INVENTOR.
BY George J. Oltsch.
ATTORNEY.

UNITED STATES PATENT OFFICE.

EUGENE CHRISTOPHER, OF URBANA, ILLINOIS.

FERTILIZER-DISTRIBUTER.

1,022,062.  Specification of Letters Patent.  Patented Apr. 2, 1912.

Application filed April 17, 1911. Serial No. 621,510.

*To all whom it may concern:*

Be it known that I, EUGENE CHRISTOPHER, a citizen of the United States, residing at Urbana, in the county of Champaign and State of Illinois, have invented certain new and useful Improvements in Fertilizer-Distributers, of which the following is a specification.

My invention relates to improvements in fertilizer distributers, the object being to provide a machine for the purpose which will successfully distribute certain substances, as crushed limestone and rock phosphate, the nature of which substances is such as to render it difficult to mechanically distribute the same, owing to the tendency thereof to pack into a solid mass unless kept in a constant state of agitation. The tendency of these substances to pack into a solid mass causes the same to bridge over the agitator where the latter is placed in the bottom of a receptacle, the substance only immediately surrounding the agitator being properly fed by the machine, thus requiring the mass above the agitator to be continually broken up by manual means, which it is the object of the present invention to obviate.

Another object of the invention is to provide a machine for the purpose intended which is exceedingly simple in structure and operation, and from which the use of sprocket wheels, bevel gears, chain drives and other devices commonly employed are eliminated, thereby providing an easier running machine with no actuating parts to be subjected to the action of the fine, gritty material used as a fertilizer, the abraisive quality of which soon causes wear upon such parts.

With these and other objects in view, the invention consists of certain novel features of construction as hereinafter described and pointed out in the claims, it being understood that minor changes of construction may be made without departing from the spirit of the invention, or sacrificing any of the advantages thereof.

In the drawings, which show the preferred embodiment of my invention—Figure 1 is a side elevation partly in section, the width of the machine being reduced for convenience of illustration, as indicated by the broken lines. Fig. 2 is an inverted view of the means employed for controlling and regulating the feed of the machine. Fig. 3 is a cross-sectional view of the body of the machine on line *x—x*, Fig. 1.

Referring now more particularly to the accompanying drawings, the machine comprises a receptacle 1, which is preferably rounded on its under side, and provided with an opening 2 extending the length thereof through which the fertilizer is fed. In order to control the feed of the fertilizer through said opening 2, depending upon the nature of the fertilizer being used, I provide an adjustable closure therefor consisting of a slide 3, extending the full length of the opening. The slide is supported by the under plates 4, which are secured, as by means of bolts 5, to the frame member 6, which latter is in turn suitably attached to the receptacle. Bars 7 pivoted at 8 with the member 6 and at 9 with the slide, are arranged in parallel diagonal relation with respect to the slide, the end of an operating lever 10 having a similar pivotal connection with said members and arranged parallel with the bars 7, as indicated at 11, whereby upon throwing the operating lever the slide will have both an endwise and lateral movement, and the size of the feed opening may be varied by means of such slide to regulate the feed.

Mounted upon a revoluble shaft 12, which extends entirely through the receptacle 1, is a hollow cylinder 13, having a large number of perforations 14, and a number of inner flanges 15 and outer flanges 16 arranged thereon in spaced relation, the outer flange ends extending in close proximity with the wall of the receptacle at its under rounded portion, whereby the rotation of the cylinder will cause the outer flanges to carry the fertilizer past the feed opening 2, the inner flanges serving to keep the fertilizer within the cylinder in a state of agitation, and the outer flanges performing the same function, and thus prevent the fertilizer from packing and cause the same to sift into and out of the cylinder through the perforations.

It has been found in practice that a small cylinder occupying but a small portion of the receptacle adjoining the feed opening in a receptacle, will not successfully feed certain fertilizers, as crushed limestone and rock phosphate, owing to the tendency of those substances to readily pack into a solid mass unless kept in a constant state of agitation, hence a large mass thereof in a receptacle above an agitating cylinder will not be broken up and will quickly pack and bridge over the cylinder, which defect is overcome in the present invention by making the agitating cylinder of a size so as to practically occupy the entire space within the receptacle, relying upon the interior of the cylinder for storage capacity, and having the perforations sufficiently large so as to permit the fertilizer to freely pass into and out of the cylinder.

The wheels 17 are keyed to the shaft 12 in order to rotate the latter and the agitating cylinder mounted thereon, castings 18 being loosely mounted on said shaft and secured to the receptacle, suitable connections being had with said castings (not shown) for drawing the machine and for holding the castings and the connected receptacle against rotation with the shaft.

It will be noted from the foregoing description that I have provided a machine for distributing fertilizer which is exceedingly simple in structure and operation, being devoid of sprockets, gears and other driving devices, with the minimum number of working parts susceptible to wear, and which will successfully distribute fertilizer having the characteristics hereinbefore referred to.

Having thus described my invention, what is claimed is:

1. A fertilizer distributer comprising a receptacle, a shaft extending therethrough and mounted upon wheels to rotate therewith, a perforated cylinder fixedly mounted upon said shaft within said receptacle, and flanges arranged lengthwise of and spaced about the inner and outer sides of the cylinder.

2. A fertilizer distributer comprising a receptacle, a shaft extending through said receptacle and mounted upon wheels to rotate therewith, a perforated cylinder fixedly mounted upon said shaft and wholly within said receptacle, flange members spaced about the periphery of said cylinder and extending in close proximity with the side of the receptacle, a feed opening in the bottom of the receptacle, and means for controlling the feed opening.

3. A fertilizer distributer comprising an outer receptacle, a feed opening in the bottom of said receptacle, a perforated cylinder mounted to rotate within said receptacle, and flange members spaced about the periphery of said cylinder, whereby the fertilizer will be carried upwardly between the cylinder and receptacle and drop into the cylinder through its perforations at the top and out of its perforations at the bottom.

In testimony whereof I affix my signature, in presence of two witnesses.

EUGENE CHRISTOPHER.

Witnesses:
F. O. SALE,
FRED HESS.

---

Copies of this patent may be obtained for five cents each, by addressing the "Commissioner of Patents, Washington, D. C."